(12) United States Patent
Upadhyay et al.

(10) Patent No.: US 9,080,488 B2
(45) Date of Patent: Jul. 14, 2015

(54) METHOD FOR ESTIMATING SLIPPAGE OF A SELECTIVE CATALYST REDUCTION SYSTEM

(75) Inventors: Devesh Upadhyay, Canton, MI (US); Michiel J. Van Nieuwstadt, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 935 days.

(21) Appl. No.: 13/071,321

(22) Filed: Mar. 24, 2011

(65) Prior Publication Data
US 2011/0185707 A1 Aug. 4, 2011

(51) Int. Cl.
*F01N 3/20* (2006.01)
*F01N 3/18* (2006.01)

(52) U.S. Cl.
CPC ... *F01N 3/18* (2013.01); *Y02T 10/47* (2013.01)

(58) Field of Classification Search
CPC .................. F01N 2900/041; F01N 2900/0418; F01N 2900/1616; F01N 2560/026
USPC .................................... 60/276, 286, 295, 301
See application file for complete search history.

(56) References Cited

U.S. PATENT DOCUMENTS

| 6,546,720 B2 * | 4/2003 | van Nieuwstadt | 60/286 |
| 2005/0282285 A1 * | 12/2005 | Radhamohan et al. | 436/55 |
| 2005/0284134 A1 * | 12/2005 | Radhamohan et al. | 60/286 |
| 2008/0250774 A1 * | 10/2008 | Solbrig | 60/295 |
| 2011/0005202 A1 * | 1/2011 | Gady et al. | 60/276 |
| 2011/0005203 A1 * | 1/2011 | Gady | 60/276 |
| 2011/0138779 A1 * | 6/2011 | Neumayer | 60/274 |

OTHER PUBLICATIONS

Upadhyay, Devesh et al., "Method for Correcting an Estimate of NH3 Stored Within a Selective Catalyst Reduction System," U.S. Appl. No. 13/071,252, 34 pages.

* cited by examiner

*Primary Examiner* — Kenneth Bomberg
*Assistant Examiner* — Jonathan Matthias
(74) *Attorney, Agent, or Firm* — Julia Voutyras; Alleman Hall McCoy Russell & Tuttle LLP

(57) ABSTRACT

A method for determining $NH_3$ and NOx slippage through a SCR is described. In one example, signals from NOx sensors positioned upstream and downstream of a SCR are processed and provide indication of $NH_3$ and NOx slippage. Engine emissions may be reduced with information provided via the NOx sensors, at least during some conditions.

20 Claims, 7 Drawing Sheets

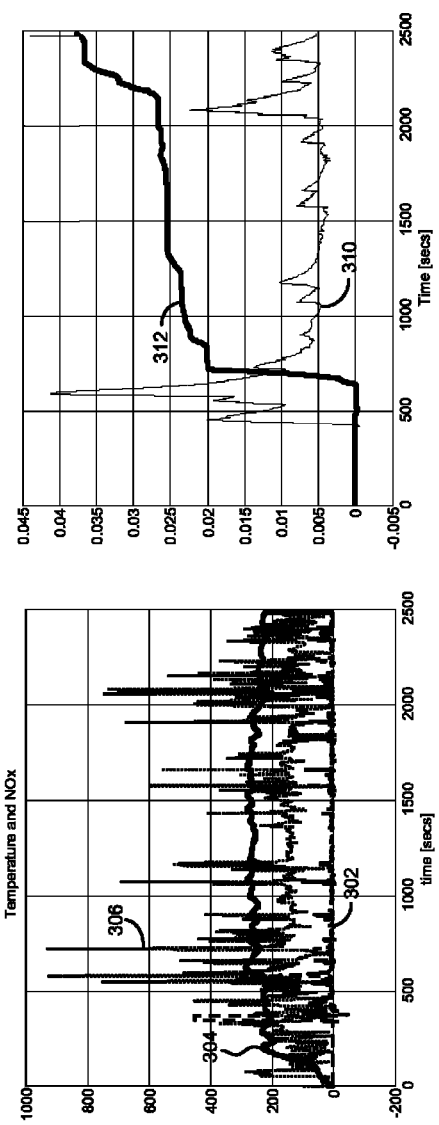

METHOD FOR ESTIMATING SLIPPAGE OF A SELECTIVE CATALYST REDUCTION SYSTEM

BACKGROUND/SUMMARY

Nitrogen oxides (e.g., NOx) may be present in exhaust gases of a vehicle. NOx may form in engine cylinders when nitrogen ($N_2$) and oxygen ($O_2$) are exposed to elevated temperatures and pressures. The NOx may be processed via a selective reduction catalyst (SCR) in the vehicle's exhaust system into $N_2$ and $H_2O$. The SCR may co-operate with a reductant such as ammonia ($NH_3$) to reduce the NOx when there is sufficient temperature within the SCR. However, if there is an insufficient amount of $NH_3$ present at the SCR, a higher amount of NOx than is desirable may pass through the SCR. On the other hand, if excess $NH_3$ is directed to or stored on the SCR, $NH_3$ may slip past the SCR. Thus, it may be desirable to provide the SCR with an amount of $NH_3$ that reduces a desirable portion of NOx from engine feedgas, yet is small enough to keep $NH_3$ from slipping through the SCR.

One way to provide $NH_3$ to a SCR is to model the engine feedgas emissions and model operation of the SCR. In a model based system, the $NH_3$ may be released to the SCR (through urea injection control) based on the estimated operating state of the SCR. However, it may be difficult to accurately estimate chemical reactions, temperatures, and similar conditions for a SCR for a variety of reasons. On the other hand, rather than a model, a NOx sensor may be placed downstream of a SCR in an effort to determine if NOx is passing through a SCR. Nevertheless, NOx sensors have a cross sensitivity to $NH_3$ so that the NOx sensor outputs a signal when $NH_3$ is present in the absence or presence of NOx. Thus, the output of the NOx sensor may make it difficult to distinguish whether a SCR is slipping NOx or $NH_3$.

The inventors herein have recognized the above-mentioned disadvantages and have developed a method for indicating a concentration of a gas, comprising: providing a $NH_3$ concentration of a gas from an output of a first NOx sensor and an output of a second NOx sensor, the first and second NOx sensors having cross sensitivity between NOx and NH3, the first NOx sensor located upstream of the second NOx sensor in a direction of gas flow.

By considering an appropriately designed distribution that extracts the time dependent correlation in phase between the signals of the two NOx sensors it may be possible to distinguish between NOx and $NH_3$. The sampled version of this distribution is designed to retain properties of both a short time Fourier Transform as well as the coherence function, thereby retaining both frequency correlation as well as phase information in time over short interval windows.

The present description may provide several advantages. For example, the approach may reduce engine NOx and $NH_3$ emissions by providing feedback of NOx and $NH_3$ exiting a SCR so that delivery of $NH_3$ can be controlled responsive to use. Further, the approach may reduce system cost since both NOx and $NH_3$ may be monitored via NOx sensors and without a $NH_3$ sensor. The method may also reduce the amount of $NH_3$ used within the SCR since $NH_3$ injection can be reduced when $NH_3$ is sensed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3A-3B show prophetic performance data for a $NH_3$ detection metric;

DETAILED DESCRIPTION

Figure 1:
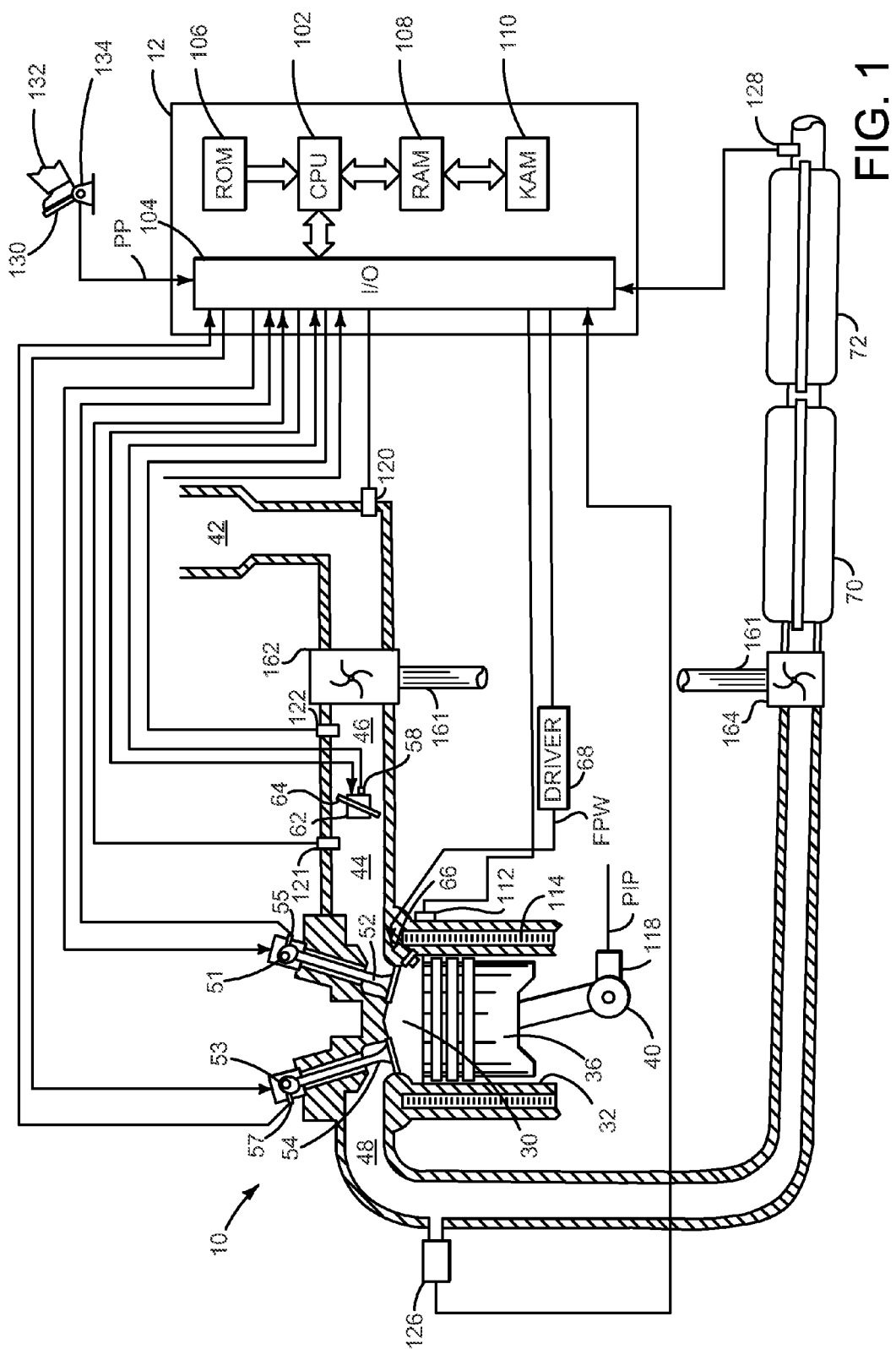
FIG. 1 shows a schematic depiction of an engine.
Figure 4B:
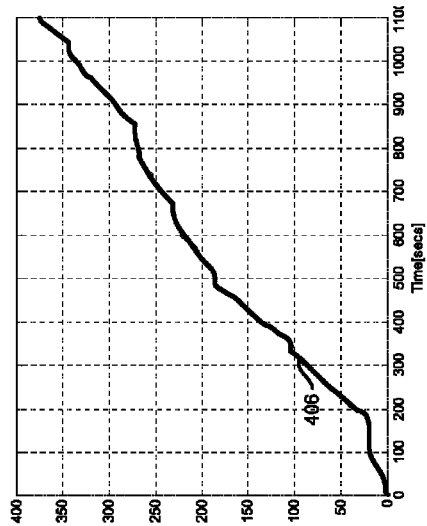
FIGS. 4A-4B show prophetic data for an alternative NOx detection metric.
Figure 4A:
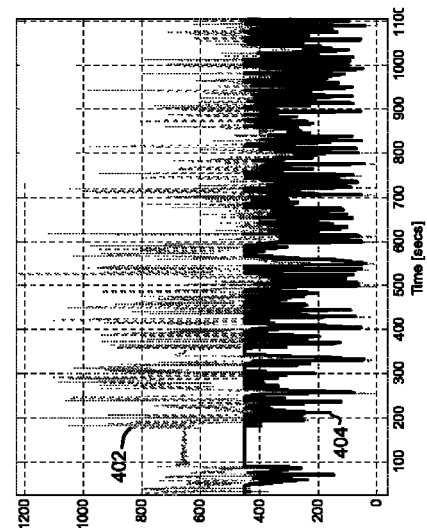
Figure 5:
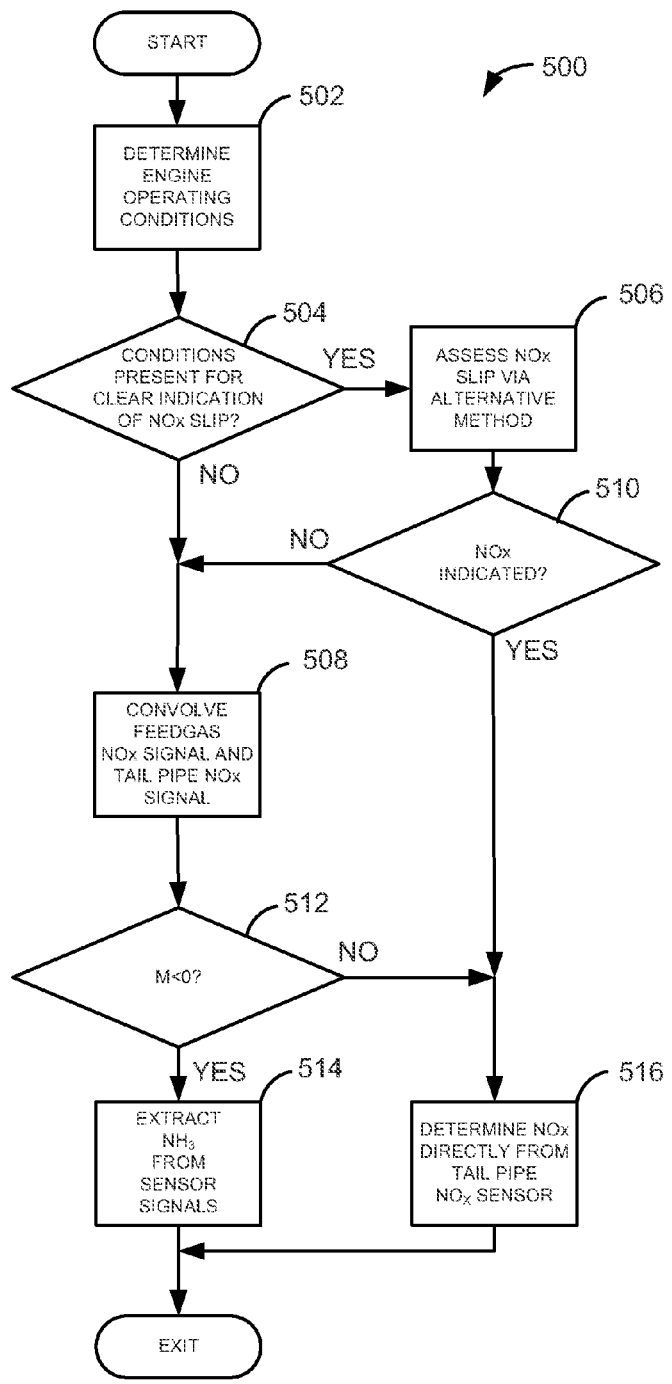
FIG. 5 shows example a flowchart of an example method to distinguish $NH_3$ from NOx in the output of a NOx sensor.
Figure 6:
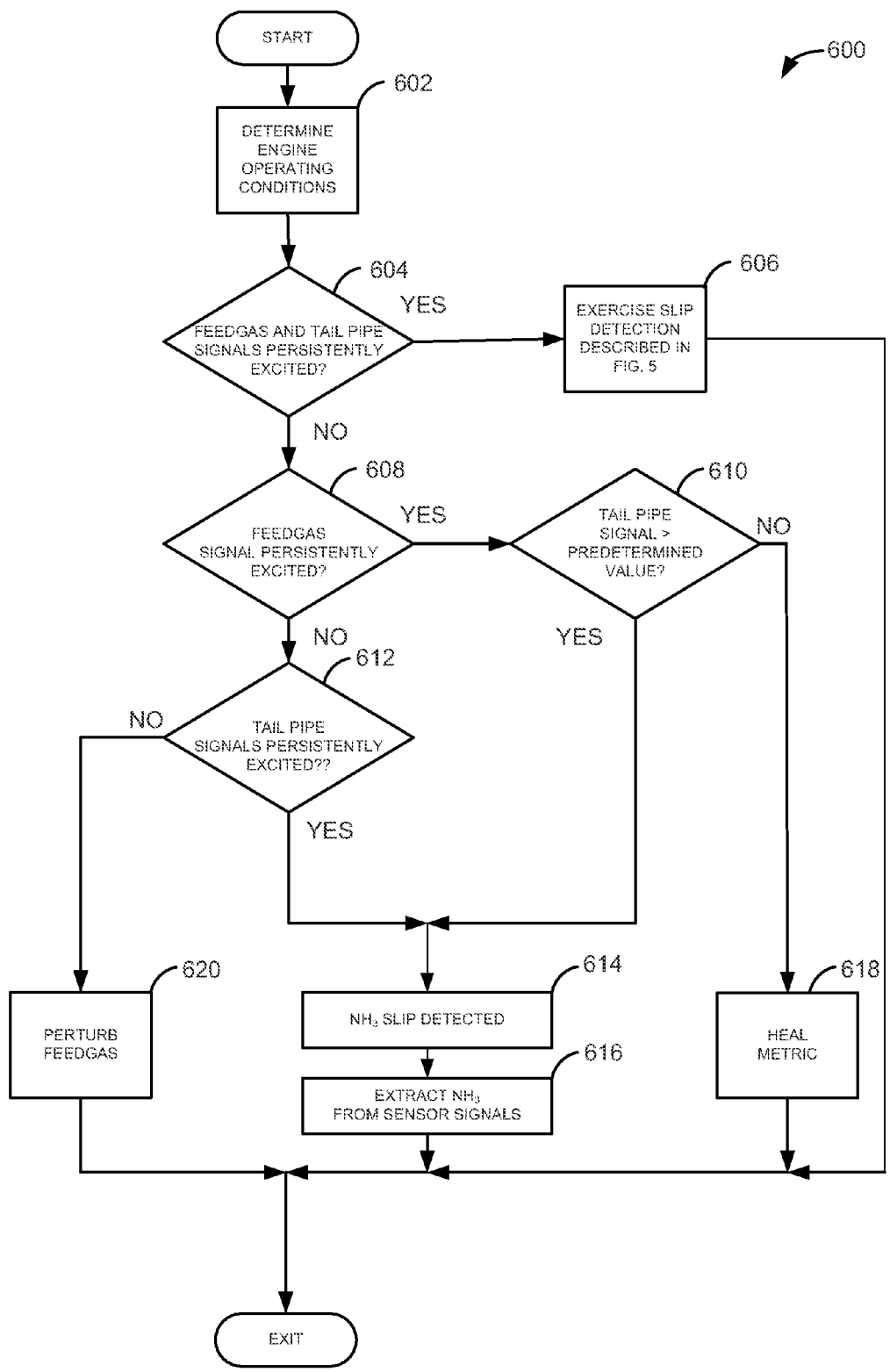
FIG. 6 shows a flowchart of an example method for arbitrating between indicating the presence of NOx or $NH_3$ during period of little variation in NOx sensor output.
Figure 7:
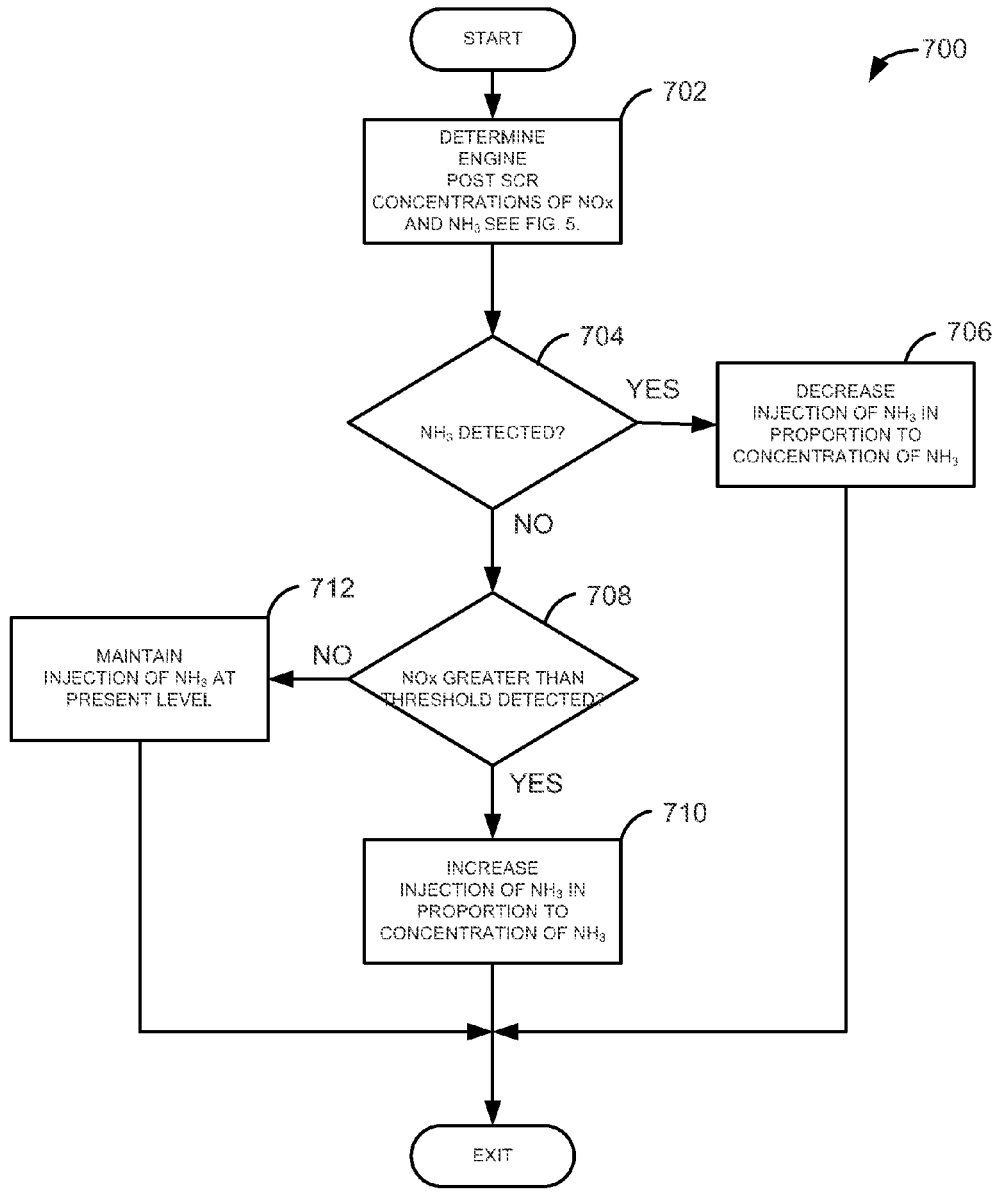
FIG. 7 shows a flowchart of an example method for using determined exhaust concentrations of NOx and $NH_3$.

The present description is related to distinguishing the presence of $NH_3$ from NOx in engine exhaust gases via one or more NOx sensors. Further, the description provides for controlling an amount of $NH_3$ supplied to a SCR based on distinguishable NOx sensor output. FIG. 1 shows one example of a boosted direct injection engine where the methods of FIGS. 5 and 6 may be applied. FIGS. 2A-3B show sensor signals and $NH_3$/NOx determined according to the present description. FIGS. 4A-4B show signals for one example of speeding up NOx/$NH_3$ detection. FIGS. 5 and 6 show example flowcharts of ways to distinguish $NH_3$ from NOx in the output of a NOx sensor according to the present description. Finally, FIG. 7 shows a flowchart of one example method to apply determined $NH_3$ and NOx concentrations to an engine system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. Fuel injector 66 is supplied operating current from driver 68 which responds to controller 12.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device 70 in the vicinity of NOx sensor 126. In other examples, NOx sensor 126 may be omitted and an oxygen sensor provided in its place. In still other examples, a second UEGO sensor may be located downstream of one or more exhaust after treatment devices. In the present example, a second NOx sensor 128 is provided downstream of an emissions control device.

Emissions device 70 is shown positioned in the engine exhaust system downstream of turbocharger turbine 164. Emissions device 70 can include a particulate filter and oxidation catalyst bricks, in one example. Alternatively, emissions device 70 may be configured as a SCR. NOx sensor 128 may be moved to a location between emission device 70 and emission device 72 if emissions device 70 is configured as a SCR. Emissions device 72 is shown located downstream of emissions device 70 in the direction of exhaust flow and is configured as a SCR when emissions device 70 is configured as a particulate filter or oxidation catalyst. NOx sensor 128 is shown positioned downstream of emissions device 72 when emissions device 72 is a SCR. In alternative examples, emissions devices 70 and 72 along with NOx sensor 128 may be positioned upstream of turbine 164.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measure of boost pressure from pressure sensor 122; a measurement of engine manifold pressure (MAP) from pressure sensor 121 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: an engine; a first NOx sensor; a second NOx sensor; and a controller, the controller including instructions for providing a $NH_3$ concentration and a NOx concentration of a gas output from the engine, the $NH_3$ concentration and the NOx concentration provided from an output of the first NOx sensor and an output of the second NOx sensor, the first NOx sensor located upstream of the second NOx sensor in a direction of gas flow. The engine system further comprises a SCR, the SCR positioned in an exhaust system of the engine between the first NOx sensor and the second NOx sensor. The engine system also includes where the engine is a diesel engine, and where the controller includes further instructions for adjusting $NH_3$ (urea) supplied to the SCR in response to the $NH_3$ concentration or the NOx concentration.

Figure 2B:
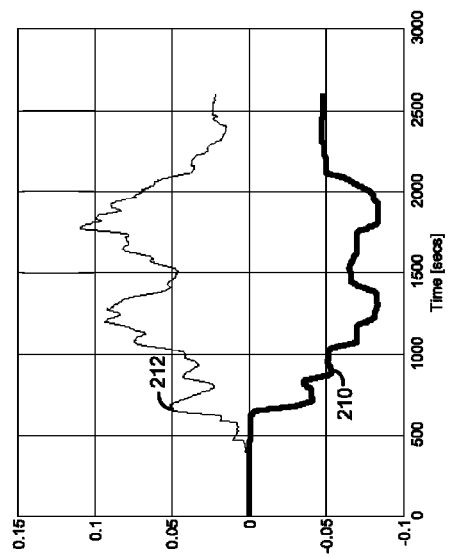
FIGS. 2A-2B show prophetic performance data for a NOx detection metric.
Figure 2A:
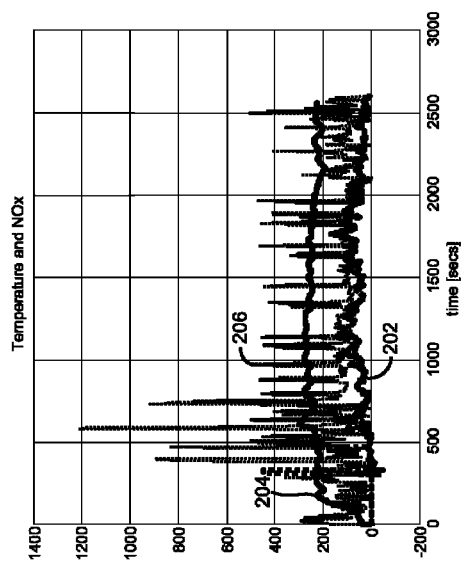

Referring now to FIG. 2A, prophetic performance data for a $NH_3$ detection metric is shown. The Y axis represents signal amplitude for the signals represented by lines 202-206. The X axis represents time in seconds, and time increases from the left to the right side of the plot.

Lines 202 and 206 represent NOx sensor output signals. Line 206 represents a signal from a NOx sensor located upstream of a SCR in the direction of exhaust flow. Line 202 represents a signal from a NOx sensor located downstream of the SCR in the direction of exhaust flow. Line 204 represents a temperature of the SCR.

It can be seen from FIG. 2A that the output of the NOx sensor located upstream of the SCR outputs a higher amplitude signal as compared to the NOx sensor located downstream of the SCR. Further, the signal from the downstream NOx sensor remains low at the beginning of the plot and then eventually increases at a slow rate. Such a signal is typical signature of $NH_3$ slip and it shows the cross sensitivity of the downstream NOx sensor to $NH_3$. The SCR temperature is shown rising quickly after time zero. NOx initially slips past the SCR when the SCR temperature is low. The SCR transitions to slipping $NH_3$ after the SCR reaches operating temperature due to excess $NH_3$ stored within the SCR. The slippage of NOx may be attributable to low storage of $NH_3$ while slippage of $NH_3$ may be attributable to excess storage of $NH_3$.

Referring now to FIG. 2B, the signals shown occur at the same time as the signals of FIG. 2A. FIG. 2B shows metric line 210 and NH$_3$ concentration line 212. Line 212 is the filtered (e.g. signal processed via the method of FIG. 5) signal of NOx sensor located downstream of a SCR and it indicates NH$_3$ slip. Metric line 210 is a negative number when it is judged from the upstream and downstream NOx sensors that NH$_3$ is slipping through the SCR according to the methods of FIGS. 5 and 6. Metric line 210 becomes negative after about 600 seconds. At about the same time, filtered NH$_3$ line 212 begins to increase. The filtered NH$_3$ signal of line 212 is provided according to the method of FIGS. 5 and 6. Thus, metric line 210 is used to distinguish between whether the SCR is slipping NOx or NH$_3$.

Referring now to FIG. 3A, prophetic performance data for a NOx slip detection metric is shown. The Y axis represents signal amplitude for lines 302-306. The X axis represents time in seconds, and time increases from the left to the right side of the plot.

Lines 302 and 306 represent NOx sensor output signals. Line 306 represents a signal from a NOx sensor located upstream of a SCR in the direction of exhaust flow. Line 302 represents a signal from a NOx sensor located downstream of the SCR in the direction of exhaust flow. Line 304 represents a temperature of the SCR.

Similar to FIG. 2A, it can be seen from FIG. 3A that the output of the NOx sensor located upstream of the SCR outputs a higher amplitude signal as compared to the NOx sensor located downstream of the SCR. Further, the signal from the downstream NOx sensor remains low at the beginning of the plot and then eventually increases. The signature of signal 302 is typical for NOx slippage past a SCR. The SCR temperature is shown rising quickly after time zero. Thus, after a period of time when the SCR is at operating temperature, NOx begins to slip through the SCR as indicated by the output of the second NOx sensor increasing. The NOx sensor response is comprised of intermittent spikes typical of NOx slip.

Referring now to FIG. 3B, the signals shown occur at the same time as the signals of FIG. 3A. FIG. 3B shows metric signal line 312 and NOx concentration line 310. Metric signal line 312 is a positive number when it is judged from the upstream and downstream NOx sensors that NOx is slipping through the SCR according to the methods of FIGS. 5 and 6. Metric signal line 312 becomes positive after about 650 seconds. The output of the NOx sensor is validated at the time metric signal line 312 goes positive and NOx is directly determined from the NOx sensor output. The NOx concentration line 310 is provided according to the method of FIGS. 5 and 6. It should be noted that the same algorithm (e.g., the method of FIG. 5) was used to provide the metric signals of FIGS. 2B and 3B during different SCR operating conditions. Differentiation between NOx and NH$_3$ is based on whether the metric signal is positive or negative.

Referring now to FIGS. 4A-4B prophetic data for an alternative NOx detection metric is shown. In particular, during some operating conditions where there may be a higher confidence level for determining NOx slip, an alternative method for distinguishing NOx from NH$_3$ may be provided so as to increase fidelity of NOx detection during times of rapid and large magnitude NOx change. The data of FIGS. 4A-4B may be used with the methods of FIGS. 5-6 and data in FIG. 4B may be provided via the method of FIG. 5.

Line 402 represents a signal from a feedgas NOx sensor. Line 404 represents a signal from a post SCR NOx sensor after regeneration of a diesel particulate filter (DPF) when near zero NH$_3$ is stored within the SCR. The output of the post SCR NOx sensor signal saturates at a value of 450 ppm. If a threshold signal value in a range of 400 ppm to 435 ppm is established and a number of times that the post SCR NOx sensor signal crosses the threshold is counted, the count progresses as shown in line 406 of FIG. 4B. In one example, a range of between 400 and 435 defines an expected range of swing in a NOx slip signal. Thus, as shown in FIG. 4B, from time zero to 1200 seconds, approximately 400 counts or crossings of the threshold level are counted. A crossing frequency of about 0.33 Hz can be established from the data, a value which is a high level for NH$_3$ slip with a peak slip value at the threshold between 400 ppm to 435 ppm. Thus, via a combination of a high NOx sensor output and a high number of times an appropriate threshold NOx signal is crossed, an increased degree of confidence may be established in that the output of the post SCR NOx sensor reflects NOx slip rather than NH$_3$ slip. In this way, a threshold signal level and a number of times that a sensor output crosses the threshold signal level can be used to distinguish whether the NOx sensor output has a higher propensity for indicating NOx.

Referring now to FIG. 5, a flowchart of an example method to distinguish NH$_3$ form NOx in the output of a NOx sensor is shown. The method of FIG. 5 is executable via instructions stored in controller 12 in FIG. 1.

Method 500 provides an estimate of NOx and NH$_3$ slip based on signal processing of the feedgas and tailpipe (e.g., upstream and downstream) NOx sensor signals. Note that the algorithm works equally well if the feedgas NOx sensor is replaced by its equivalent model. The method uses a metric that is a convolution of the forward difference of the tail pipe NOx signal and an appropriately windowed feedgas NOx signal. Where the forward difference is defined as:

$$\Delta y = y(k) - y(k-1)$$

Where y is the sample value and k is the sample number. In one example, the window is such that only the decaying part of a transient NOx signal is used to estimate NH$_3$ and NOx slippage. The inventors have recognized a difference in bandwidth of the sensor signals for the two responses between NOx slip and NH$_3$ slip in the output of the tailpipe or downstream NOx sensor output and the uniqueness of the ensuing correlation. Output of a tailpipe or downstream NOx sensor signal may be represented by the following equation:

$$Y_k^{TP} = Y_k^{NOx} + \alpha Y_k^{NH3} = (1-\eta_k)F_k + \alpha Y_k^{NH3}$$

Where $Y_k^{TP}$ is the tailpipe NOx sensor output signal at the $k^{th}$ time instant; $Y_k^{NOx}$ is the NOx component of the tailpipe NOx signal at the $k^{th}$ time instant; $Y_k^{NH3}$ is the NH$_3$ component of the tailpipe NOx signal at the $k^{th}$ time instant; $\alpha$ is an empirically determined cross sensitivity factor of the NOx sensor to NH$_3$; $\eta$ is catalyst efficiency; $F_k$ is a feedgas NOx concentration from a feedgas or upstream NOx sensor, for example; and k is the $k^{th}$ time instant.

In one example, it may be assumed that for a nominal system the exhaust gases at a post SCR location are either NOx or NH$_3$. Further, transitions between slip regimes are often possible, such as during regeneration events. Both NOx and NH$_3$ can coexist in the post SCR location only for: deteriorated SCR, over stored SCR at a pre-light off conditions, and over dosing of urea at high temperature conditions. Not all conditions occur under nominally controlled after treatment systems. Thus, the output for the downstream or tailpipe NOx sensor may be expressed as:

$$Y_k^{TP} = Y_k^{NOx} = (1-\eta_k)F_k \text{NO}_x \text{ slip case}$$

$$Y_k^{TP} = \alpha Y_k^{NH3} \text{NH}_3 \text{ slip case}$$

Consequently, for the $NO_x$ slip case, it may be shown that the signal content of the NOx sensor positioned at a downstream SCR location will be a modified version of the feedgas NOx sensor signal, the modification will only be in magnitude as a function of the catalyst efficiency; however, the frequency content will remain similar. Thus, for a condition of NOx slip only, the Fourier Transforms of the feedgas and tailpipe NOx signals will show the same frequency content. On the other hand, during conditions of $NH_3$ slip, the Fourier Transform output may be quite different. The $NH_3$ slip signal may be described as a slowly varying carrier signal with some frequency modulation due to injection from feedgas influences. The difference in behavior between the post SCR NOx sensor signal due to NOx slip or $NH_3$ slip, relative to the FG NOx signal, is exploited in creating a metric (metric M is described in more detail below) that helps establish the nature of the slip and hence the meaning of the post SCR NOx sensor signal.

If a SCR is slipping NOx, then the tailpipe NOx signal is in phase with the feedgas NOx signal, although the tailpipe NOx signal may be attenuated by a scaling factor equivalent to the SCR efficiency. On the other hand, if the SCR is slipping $NH_3$, then the tailpipe NOx will show a difference in both phase and frequency relative to the feedgas NOx signal. The phase and frequency differences are primarily due to the $NH_3$ slip signal being a slowly varying signal. The different behavior between the feedgas and tailpipe NOx signals for $NH_3$ slip relative to NOx slip may be exploited in designing the detection metric. Finally, it is also recognized that the correlation is unambiguous and precise if evaluated during the phase when the FG NOx is decaying, defined as:

$$\Delta F^- = (\Delta F < 0)$$

The method of FIG. 5 provides for distinguishing between NOx and $NH_3$ in the output of a NOx sensor based on the differences in outputs of two NOx sensors. Alternatively, the method can also distinguish between NOx and $NH_3$ when only one NOx sensor is present in a system and where NOx in the system (e.g., feedgase NOx) is estimated via a model.

At 502, method 500 determines engine operating conditions. Engine operating conditions may include but are not limited to engine temperature, engine speed, engine air amount, engine torque, output of NOx sensors positioned in the exhaust system of the engine, and SCR temperature. In some examples, engine feedgas NOx may be inferred from engine speed, engine torque, and engine temperature. Method 500 proceeds to 504 after determining engine operating conditions.

At 504, method 500 judges whether or not conditions are present for providing a clear indication of NOx from the post SCR NOx sensor. In one example, conditions shortly after regeneration of a DPF allow for distinguishing NOx from $NH_3$ in the output of a NOx sensor. If conditions are present for a clear indication of NOx slip from the post SCR NOx sensor, method 500 proceeds to 506. Otherwise, method 500 proceeds to 508.

At 506, an alternative method for distinguishing the output of a post SCR NOx sensor from NOx and $NH_3$ is provided. In a first alternative method as described in FIGS. 4A-4B, a sensor output threshold reflecting a higher propensity for indicating NOx slippage is provided. If the output of the NOx sensor crosses the threshold more than a predetermined number of times during a predetermined time interval, it may be determined that the output of the NOx sensor reflects NOx slippage past a SCR positioned upstream (according to the direction of exhaust flow) of the NOx sensor. As a result, NOx slippage may be determined directly from the output of the NOx sensor positioned downstream of the SCR.

In a second alternative method for distinguishing when NOx is slipping by a SCR during conditions for a clear indication of NOx slip, NOx slippage may be determined via a signal energy method. In particular, signal energy of the NOx sensor signal may be determined according to the following equation:

$$E = \int_{t0}^{tf} (y(t))^2 \, dt$$

Where E is the signal energy and y(t) is the NOx sensor signal. The signal energy may be compared to a threshold level. If the energy of the NOx signal exceeds the threshold level, the NOx sensor output is processed as a NOx level rather than a $NH_3$ level. In some examples, the signal energy content method may be improved by considering the high frequency energy content of the downstream NOx sensor rather than the signal amplitude. The high frequency energy of the NOx sensor signal may be determined according to the following equation:

$$E_{trans} = \int_{t0}^{tf} \left(\frac{dy(t)}{dt}\right)^2 dt$$

Where $E_{trans}$ is the high frequency or transient signal energy and y(t) is the NOx sensor signal. Similarly, the high frequency energy content of the signal may be compared to a predetermined threshold level of signal energy. If the high energy content is greater than the threshold, the NOx sensor output is processed as a NOx level rather than a $NH_3$ level.

In a third alternative method for distinguishing when NOx is slipping by a SCR during conditions for a clear indication of NOx slip, NOx slippage may be determined via a running standard deviation of the signal output from the NOx located downstream of the SCR. In this method the NOx sensor signal normalized variance defined by the ratio of the standard deviation and the mean is assessed. Thus, a large metric value is indicative of a signal with large and rapid variations which can be assessed to be due to a predominant NOx component in the TP signal. Accordingly, the output of the NOx sensor located downstream of the SCR can be interpreted as NOx.

In a fourth alternative method for distinguishing when NOx is slipping by a SCR during conditions for a clear indication of NOx slip, the NOx sensor output can be evaluated via correlations of output of a NOx sensor located upstream of the SCR and output of a NOx sensor located downstream of the SCR. In one example, the correlation is defined as:

$$\rho_{xy} = \frac{E[(x-\bar{x})(y-\bar{y})]}{\sigma_x \sigma_y} = \frac{1}{N-1} \sum_{k=1}^{N-1} \left[\left(\frac{x_k - \bar{x}}{\sigma_x}\right)\left(\frac{y_k - \bar{y}}{\sigma_y}\right)\right]$$

Where $\rho_{xy}$ is a metric $[-1 \leq \rho_{xy} \leq 1]$; x is an upstream NOx sensor output, y is a downstream NOx sensor output; $\bar{x}$, $\bar{y}$ are the mean values of x and y respectively; $\sigma_x$ and $\sigma_y$ are the standard deviations of x and y respectively, and where N is the total sample count. A value of $\rho_{xy}$ greater than a predetermined threshold $+\theta$, $0 \leq \theta \leq 1$ is a clear indication of NOx slip, since it indicates a high degree of coherence between the NOx sensor signals.

Method 500 proceeds to 510 after one of the above methods are used to determine whether or not the output from the NOx sensor located downstream of the SCR is a clear indication of NOx. It should also be mentioned that a combination of the above methods may be used to assess NOx slip during conditions for clearly indicating NOx slip.

At 510, method 500 judges whether or not NOx is indicated according to the results of one or more methods described at 506. If NOx is indicated, method 500 proceeds to 516. Otherwise, method 500 proceeds to 508.

At 508, method 500 convolves signals from or related to a NOx sensor located upstream of a SCR and a NOx sensor located downstream of the SCR. In one example, a convolution $\Delta F^-\!*\!\Delta TP$ is performed on signals from the upstream and downstream NOx sensors. Where $\Delta F^-$ is the forward difference in the output of the upstream or feedgas NOx sensor when the NOx sensor output is decaying, and where ATP is the forward difference in the output of the downstream or tailpipe NOx sensor.

In an alternative example, a metric based on convolution is provided to improve NOx and $NH_3$ prediction robustness. The metric is formed via the following equations:

$$\frac{dM}{dt} = (c_1 \Pi \Delta F \times \Delta TP) - (c_2 \times |\Pi \eta \times \Delta TP|) - c_3 M$$

Where M is a metric for determining whether the output of a NOx sensor located downstream of a first NOx sensor represents NOx or $NH_3$; where $\Pi_{\Delta F}$ is a unit step function for the duration of decaying feedgas NOx ($\Delta F<0$); where $\Pi_\eta$ is a unit step function for the duration when the efficiency of the SCR is <0; where ATP is the forward difference in the TP NOx sensor output or the NOx sensor output downstream of the first NOx sensor (e.g., downstream of a SCR); $c_1$ is an empirically determined calibration coefficient that is greater than zero if $\Delta F<0$ and SCR efficiency $\eta$ is $\geq 0$, otherwise $c_1$ is zero; $c_2$ is an empirically determined calibration coefficient that is greater than zero if SCR efficiency $\eta$ is $\leq 0$, otherwise $c_2$ is zero; $c_3$ is an empirically drift gain that is greater than zero if output of a downstream NOx sensor is less than<a threshold downstream NOx sensor level and M<0.

In some examples, the $c_1$ coefficient may be an increasing function in feedgas NOx (e.g., dFGNOx/dt) so that during higher loads, such as during vehicle acceleration, NOx slipping may be established with a higher level of certainty. Alternatively, $c_1$ may be a function of increasing tail pipe NOx. In still other examples, $c_1$ may be a decreasing function of the derivative in demand torque so that $c_1$ increases when the operator releases the accelerator pedal. If NOx is slipping, the tail pipe NOx sensor output signal may rapidly drop during tip-outs (e.g., release of the accelerator pedal), so that NOx and $NH_3$ may be assessed with more certainty.

The above algorithm uses the deterministic $NH_3$ slip case (when tail pipe sensor reads>Feedgas values→η<0) to update the metric at a faster rate (e.g., via gain term $c_2$) thereby guaranteeing convergence to the NH3 slip regime.

Finally, there may be conditions when the NOx/$NH_3$ slip regime transitions rapidly from $NH_3$ to no slip. In such conditions, the metric with a value M<0 (due to prior $NH_3$ slip) may not have an opportunity to heal back since ΔTP~0 forcing a 0 metric update rate. For such conditions, a healing mechanism is introduced via a drift gain $c_3$ that acts to return the metric value to 0 at a fast rate. Method 500 proceeds to 512 after feedgas and tailpipe NOx signals are convolved.

At 512, method 500 judges whether or not the value of metric M described above is less than zero. If so, method 500 proceeds to 514. Otherwise, method 500 proceeds to 516.

At 514, method 500 extracts an amount of $NH_3$ present in downstream NOx sensor signal via the following equation:

$$C_{NH_3} = \frac{Y_{TP} - (1-\eta_{pred})C_{NOx}^{FG}}{\alpha}$$

Where $C_{NH3}$ is a predicted concentration of $NH_3$ at the downstream NOx sensor; $Y_{TP}$ is the downstream NOx sensor signal as measured; $C_{NOx}^{FG}$ is the concentration of NOx in the feedgas from the upstream NOx sensor or model, α is the cross sensitivity factor of the NOx sensor to $NH_3$, and where η is the estimated efficiency of the SCR. Note that the SCR efficiency may be modeled as a function of gas flow rate, NOx entering the SCR, $NH_3$ storage on the SCR, and the temperature of the SCR. Method 500 proceeds to exit after determining a concentration of $NH_3$ in the exhaust gases at the downstream NOx sensor.

At 516, method 500 determines the concentration of NOx at the downstream NOx sensor directly from the output of the downstream NOx sensor since it is determined at 504 that the slip regime is solely NOx. In one example, method 500 converts a voltage signal from the NOx sensor to a NOx concentration via a transfer function that relates voltage to NOx concentration. Method 500 exits after determining the NOx concentration at the downstream NOx sensor.

Referring now to FIG. 6, a flowchart of an example method for arbitrating between indicating the presence of NOx and $NH_3$ during a period of little variation in NOx sensor output is shown. The method of FIG. 6 is executable via instructions stored in controller 12 in FIG. 1.

At 602, method 600 determines engine operating conditions. Engine operating conditions may include but are not limited to engine speed, engine torque, engine temperature, SCR temperature, NOx signals post and pre SCR, throttle position, fuel injection parameters (e.g., injection timing and fuel amount delivered), and EGR amount. Method 600 proceeds to 604 after determining engine operating conditions.

At 604, method 600 judges whether or not feedgas and tail pipe NOx sensor signals are persistently excited (e.g., varying consistently with time and in amplitude). One method to establish that a signal is persistently excited is to utilize the energy based techniques described above. In one example, method compares a present sampled NOx sensor signals to a previously sampled (e.g., sampled at an earlier time) NOx sensor signals. If the NOx sensor signals have changed by less than a threshold amount over an extended time window, it may be determined that the output of the NOx sensors is not persistently varying. Of course, in some examples, method 600 may determine the amount of NOx sensor variation over a period of time (e.g., 10 seconds). For example, if the standard deviation of one or more signals are less than a threshold amount over the time interval, it may be determined that the signals are not persistently excited. If the outputs of the feedgas and tail pipe NOx sensors are persistently excited, method 600 proceeds to 606. Otherwise, method 600 proceeds to 608.

At 606, method 600 employs the method of FIG. 5 and determines the amount of NOx and/or $NH_3$ present at the downstream (e.g., tailpipe NOx sensor). In particular, method 600 determines NOx and $NH_3$ according to a metric M. Method 600 proceeds to exit after executing the method of FIG. 5.

At 608, method 600 judges whether or not a signal from an upstream (e.g., feedgas) NOx sensor is persistently excited. If method judges that the feedgas NOx sensor signal is persistently excited and the tail pipe NOx signal is not persistently excited, method 600 proceeds to 610. Otherwise, method 600 proceeds to 612 since both signals are persistently excited.

At 610, method 600 judges whether or not a signal from the tail pipe NOx sensor is greater than a predetermined value. The predetermined value may be empirically determined during dynamometer testing, for example. If method 600 judges that the tail pipe NOx sensor signal is not greater than the predetermined value, method 600 proceeds to 618. Otherwise, method 600 proceeds to 614 to declare that $NH_3$ slip is present.

At 612, method 600 judges whether or not the tail pipe NOx sensor is persistently excited. If method 600 judges that the tail pipe NOx sensor is persistently excited, method 600 proceeds to 614. Otherwise, method 600 proceeds to 620 since neither feed gas nor tail pipe signals are persistently excited.

At 620, method 620 perturbs the NOx sensor signals. In one example, method 600 perturbs the NOx sensor signals via adjusting fuel injection timing. In another example, method 600 perturbs the NOx sensor signal via varying a position of an EGR valve. In this way, method 600 varies the amount of NOx produced by the engine to excite the NOx sensor signals so that a difference in phase between sensor outputs may be used to distinguish NOx from $NH_3$ in the output of the tail pipe NOx sensor. The actuators (e.g., EGR valve) may be varied according to a predetermined function that varies with engine operating conditions so that the output of each NOx sensor varies by a limited amount. In this manner, the NOx provided by the engine to the sensors may be limited. Method 600 proceeds to exit after perturbing the feedgas NOx.

At 614, method 600 declares that $NH_3$ slip is present based on attributes of the upstream and downstream NOx sensor outputs. In particular, the downstream NOx sensor output is significantly greater than the output of the upstream NOx sensor or the downstream NOx sensor output is persistently excited while the upstream NOx sensor output is not persistently excited. Method 600 proceeds to 616 after $NH_3$ slip is declared.

At 616, method 600 extracts an amount of $NH_3$ from the tail pipe NOx sensor signal. In particular, $NH_3$ is extracted from the tail pipe NOx sensor signal as described at 514 of FIG. 5. Method 600 proceeds to exit after an amount of $NH_3$ is extracted from the tail pipe NOx sensor signal.

Referring now to FIG. 7, a flowchart of an example method for using determined concentrations of NOx and $NH_3$ is shown. The method of flowchart 7 is executable via instructions of controller 12 in FIG. 1. Further, the method of FIG. 7 may be applied to the system illustrated in FIG. 1.

At 702, method 700 determines the concentrations of NOx and $NH_3$ in vehicle exhaust at a location in the vehicle's exhaust system downstream of a SCR. In one example, method 700 determines the concentration of NOx and $NH_3$ in exhaust according to the method of FIG. 5 via an upstream NOx sensor or model and a downstream NOx sensor. Method 700 proceeds to 704 after NOx and $NH_3$ concentrations are determined.

At 704, method 700 judges whether or not $NH_3$ is detected in the exhaust gases. If so, method 700 proceeds to 706. Otherwise, method 700 proceeds to 708. In other examples, method 700 may proceed to 706 when more than a threshold concentration of $NH_3$ is detected.

At 706, method 700 decreases an amount of $NH_3$ (urea) injected to the vehicle exhaust system in proportion to the concentration of $NH_3$ determined in the exhaust system at a location downstream of the SCR. In one example, the amount of $NH_3$ injected to the exhaust system may be reduced via reducing an on time of a $NH_3$ (urea) injector. Method 700 exits after reducing the amount of $NH_3$ injected to the exhaust system.

At 708, method 700 judges whether or not NOx in the vehicle exhaust system at a location downstream of a SCR is greater than a threshold level. If so, method 700 proceeds to 710. Otherwise, method 700 proceeds to 712.

At 710, method 700 increases an amount of $NH_3$ injected to the vehicle exhaust system in proportion to the concentration of NOx detected downstream of the SCR. The amount of $NH_3$ may be increased via increasing an on time of a $NH_3$ injector. In some examples, the temperature of the SCR may also be increased via adjusting engine throttling, for example. Method 700 exits after adjusting the amount of $NH_3$ injected to the vehicle exhaust system.

At 712, method 700 maintains the present level of $NH_3$ injection to the vehicle exhaust system. In one example, the amount of $NH_3$ injected to the vehicle exhaust system may be based on engine speed and engine load. Method 700 exits after 712.

Thus, the methods of FIGS. 5-7 provide for a method for indicating a concentration of a gas, comprising: providing a $NH_3$ concentration of a gas from a NOx signal and an output of a first NOx sensor, the first NOx sensor having a cross sensitivity between NOx and $NH_3$, the NOx signal representative of NOx in an exhaust passage located upstream of the first NOx sensor in a direction of gas flow; and adjusting an engine actuator responsive to the $NH_3$ concentration. In this way, a separate $NH_3$ sensor does not have to be provided to detect $NH_3$. The method includes where the NOx signal is provided via a model or a second NOx sensor and representative of NOx at a location in an exhaust system of an engine upstream of a SCR, where the first NOx sensor is located in the exhaust system of the engine at a location downstream of the SCR, and where the engine actuator is a urea injector. The method further comprises providing a NOx concentration of a gas from the NOx signal and the output of the first NOx sensor, and characterizing a $NH_3$ slip state and a NOx slip state based on a value of a metric, where the metric is an interpretation of a sensitivity of performance of a SCR. The method also includes where the $NH_3$ concentration is based on a correlation of the NOx signal and the output of the first NOx sensor. The method of claim includes where the correlation is adjusted in response to an operator torque request. The method includes where the correlation is adjusted in response to a rate of change in the operator torque request.

The methods of FIGS. 5-7 also provide for indicating a concentration of a gas, comprising: flowing gases from an engine to an exhaust gas after treatment system; providing a $NH_3$ concentration of the gases from a NOx signal and an output of a first NOx sensor, the first NOx sensor cross sensitive to NOx and $NH_3$, the NOx signal based on engine feed gas NOx, the first NOx sensor positioned in the exhaust gas after treatment system at a location downstream of a SCR in a direction of gas flow, the NH3 concentration based on a metric; providing a NOx concentration of the gases from the NOx signal and the output of the first NOx sensor; and adjusting an engine actuator responsive to the $NH_3$ concentration. The method includes where the NOx signal is provided via a model or a second NOx sensor, and where the metric is based on a correlation of the NOx signal and the output of the first NOx sensor. The method also includes where the correlation is a convolution of a derivative of the NOx signal and a derivative of the output of the first NOx sensor or a convolution of a forward difference of the NOx signal and a forward difference of the output of the first NOx sensor. The method includes where the convolution is evaluated only when the NOx signal is decreasing. The method includes where the correlation is a convolution of a high pass filtered NOx signal and a high pass filtered output of the first NOx sensor. The method includes where the convolution is evaluated only when the NOx signal is decreasing. In another example, the method further comprises forcibly perturbing the NOx signal or the first NOx sensor. The method also includes where the NOx signal or the first NOx sensor is forcibly perturbed via adjusting at least one of an engine EGR amount, engine fuel injection timing, and engine air amount, engine valve timing. In addition, the method includes where a slip of $NH_3$ and a slip of NOx is based on a value of the metric, where a gain of the metric is adjusted or an update of the metric is provided when SCR efficiency of less than zero. The method further includes where the metric is overridden when a number of level crossings of the output of the NOx sensor exceeds a predetermined number over a predetermined amount of time, a variance of the output of the NOx sensor is greater than a threshold amount, or a correlation that detects a coherence between the NOx signal and the output of the first NOx sensor, where the level crossings are defined as a continuous or windowed average of the output of the first NOx sensor, a predetermined boundary about a upper saturation level of the first NOx sensor, or a continuous or windowed running average of the NOx signal. Finally, the method further comprising adjusting an amount of $NH_3$ supplied to a SCR in response to the NOx concentration.

As will be appreciated by one of ordinary skill in the art, the methods described in FIGS. 5, 6 and 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I1, I3, I4, I5, V6, V8, V10, V12 and V16 engines operating in natural gas, gasoline, diesel, or alternative fuel configurations could use the present description to advantage.

The invention claimed is:

1. A method for operating an engine actuator, comprising:
providing an output of a first NOx sensor to a controller, the first NOx sensor operatively coupled to the controller;
using the controller, providing a NH3 concentration of a gas from a convolution of only a decaying part of a transient NOx signal and the output of the first NOx sensor, the transient NOx signal representative of NOx in an exhaust passage located upstream of the first NOx sensor in a direction of gas flow; and
adjusting an engine actuator operatively coupled to the controller responsive to the NH3 concentration.

2. The method of claim 1, where the transient NOx signal is provided via a model or a second NOx sensor operatively coupled to the controller and representative of NOx at a location in an exhaust system of an engine upstream of a SCR, where the first NOx sensor is located in the exhaust system of the engine at a location downstream of the SCR, and where the engine actuator is a urea injector.

3. The method of claim 1, further comprising providing a NOx concentration of a gas from the transient NOx signal and the output of the first NOx sensor, and characterizing a NH3 slip state and a NOx slip state based on a value of a metric, where the metric is an interpretation of a sensitivity of performance of a SCR, and where the metric is based on a unit step function for a duration of decaying feedgas NOx.

4. The method of claim 1, where the NH3 concentration of the gas is a NH3 concentration of the gas at a location of the first NOx sensor.

5. The method of claim 4, where the convolution is adjusted in response to an operator torque request.

6. The method of claim 5, where the convolution is adjusted in response to a rate of change in the operator torque request.

7. A method for operating an engine actuator, comprising:
flowing gases from an engine to a first NOx sensor and an exhaust gas after treatment system, the first NOx sensor operatively coupled to a controller;
using the controller, providing a NH3 concentration of the gases from a NOx signal and an output of the first NOx sensor, the first NOx sensor positioned in the exhaust gas after treatment system at a location downstream of a SCR in a direction of gas flow, the NH3 concentration based on a metric;
processing output of the first NOx sensor as NOx rather than NH3 in response to an energy content of output from the first NOx sensor exceeding a threshold; and
adjusting an engine actuator responsive to the NH3 concentration, the engine actuator operatively coupled to the controller.

8. The method of claim 7, where the NOx signal is provided via a model or a second NOx sensor operatively coupled to the controller, and where the metric is based on a unit step function for a duration when efficiency of the SCR is less than zero.

9. The method of claim 8, where the NH3 concentration is based on a correlation, and where the correlation is a convolution of a derivative of the NOx signal and a derivative of the output of the first NOx sensor or a convolution of a forward difference of the NOx signal and a forward difference of the output of the first NOx sensor.

10. The method of claim 9, where the convolution is evaluated only when the NOx signal is decreasing.

11. The method of claim 10, where the correlation is a convolution of a high pass filtered NOx signal and a high pass filtered output of the first NOx sensor.

12. The method of claim 7, where a value of the metric must be less than zero to provide the NH3 concentration.

13. The method of claim 7, further comprising forcibly perturbing the NOx signal or the first NOx sensor.

14. The method of claim 13, where the NOx signal or the first NOx sensor is forcibly perturbed via adjusting at least one of an engine EGR amount, engine fuel injection timing, engine air amount, and engine valve timing.

15. The method of claim 7, where a slip of NH3 and a slip of NOx is based on a value of the metric, where a gain of the metric is adjusted or an update of the metric is provided when SCR efficiency is less than zero.

16. The method of claim 7, where the metric is overridden when a number of level crossings of the output of the first NOx sensor exceeds a predetermined number over a predetermined amount of time, a variance of the output of the first NOx sensor is greater than a threshold amount, or a correlation that detects a coherence between the NOx signal and the output of the first NOx sensor, where the level crossings are defined as a continuous or windowed average of the output of the first NOx sensor, a predetermined boundary about an upper saturation level of the first NOx sensor, or a continuous or windowed running average of the NOx signal.

17. The method of claim 7, further comprising adjusting an amount of NH3 supplied to the SCR in response to a NOx concentration.

18. An engine system, comprising:
an engine;
an exhaust system coupled to the engine including an actuator, a first NOx sensor and a second NOx sensor; and
a controller operatively coupled to the actuator and the first and second NOx sensors, the controller including instructions for providing a NH3 concentration and a NOx concentration of a gas output from the engine, the NH3 concentration and the NOx concentration provided from an output of the first NOx sensor and an output of the second NOx sensor, the first NOx sensor located upstream of the second NOx sensor in a direction of gas flow, where the NH3 concentration is provided when a value of a convolution metric is less than zero, where slip is determined to be solely NOx when the value of the convolution metric is greater than zero, and where output of the second NOx sensor is processed as NOx when the value of the convolution metric is greater than zero, wherein the controller is configured to operate the actuator in response to the NH3 concentration.

19. The engine system of claim 18, further comprising a SCR, the SCR positioned in the exhaust system of the engine between the first NOx sensor and the second NOx sensor, and where the actuator is a urea injector.

20. The engine system of claim 19, where the engine is a diesel engine, and where the controller includes further instructions for adjusting NH3 supplied to the SCR in response to the NH3 concentration or the NOx concentration.

* * * * *